March 27, 1945.  P. C. TEMPLE  2,372,345
REGULATOR
Filed Oct. 1, 1943   3 Sheets-Sheet 1

Inventor
PAUL C. TEMPLE
By Albert G. Blodgett
Attorney

March 27, 1945.    P. C. TEMPLE    2,372,345
REGULATOR
Filed Oct. 1, 1943    3 Sheets-Sheet 3

Inventor
PAUL C. TEMPLE
By Albert G. Blodgett
Attorney

Patented Mar. 27, 1945

2,372,345

UNITED STATES PATENT OFFICE 2,372,345

REGULATOR

Paul C. Temple, Decatur, Ill., assignor to A. W. Cash Company, Decatur, Ill., a corporation of Delaware Application October 1, 1943, Serial No. 504,590

8 Claims. (Cl. 121—41)

This invention relates to regulators, and more particularly to regulators of the compensating type having a motor arranged to assume different positions under the control of a pilot device, the pilot device being actuated jointly by a control device and by a compensating mechanism connected to the motor. The control device may be subjected to a variable fluid pressure or other controlling impulse.

Regulators of this type are often used to control valves, dampers and similar devices, and under certain operating conditions there is a decided tendency for the regulator to move the controlled device back and forth in an undesirable manner with a so-called "hunting" action. While this hunting can often be minimized by increasing the operating range (the amount of pressure variation required to produce full stroke of the regulator), it is frequently important to operate within a rather narrow range of pressure variation. It is usually found that the difficulties encountered in regulating a valve or damper are more pronounced when the device is near its closed position, since a very slight movement under such conditions will effect a considerable change in the rate of flow.

It is accordingly one object of the invention to provide a regulator which will operate without appreciable hunting, even under unfavorable conditions, without necessitating a wide operating range.

It is a further object of the invention to provide a regulator which is particularly adapted to control valves, dampers, and similar devices.

It is a further object of the invention to provide a regulator which can be readily adjusted to cooperate in a desired manner with various devices having widely different operating characteristics.

It is a further object of the invention to provide a regulator which will be compact, powerful, simple of construction, and inexpensive to manufacture.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a front elevation of a regulator with the front cover thereof removed and certain parts broken away for clearness of illustration;

Fig. 6 is a sectional detail showing the connection between two of the parts.

Figure 1:
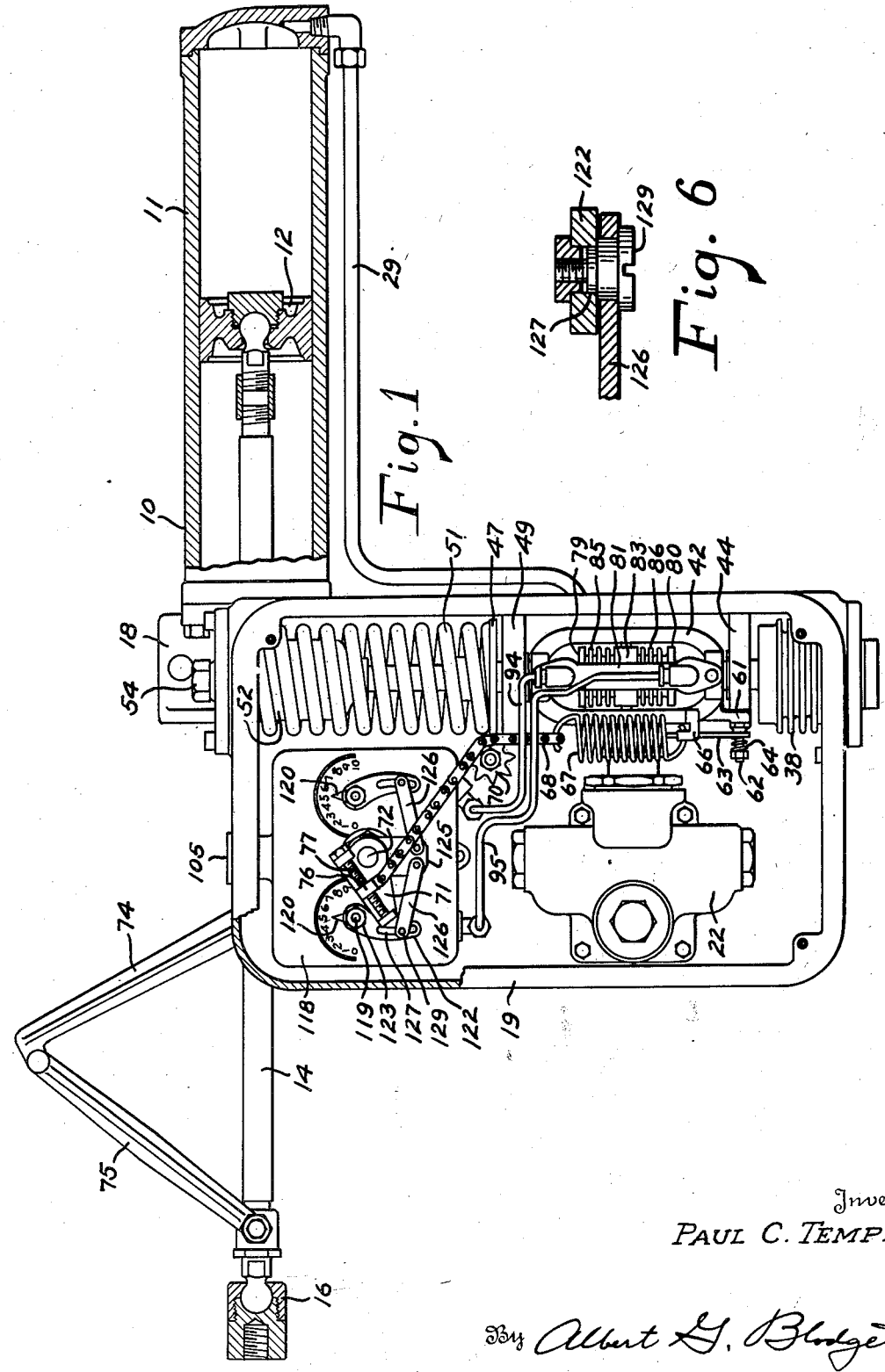

The embodiment illustrated comprises a motor 10 which is preferably of the reversible hydraulic type. This motor is provided with a cylinder 11 shown with its axis horizontal, a piston 12 slidable within the cylinder, and a piston rod 14 extending to the left from the piston and through a guideway and stuffing box 15 at the left end of the cylinder. The piston rod 14 carries a ball-and-socket joint 16 which may be connected by a suitable rod with the valve, damper or other device to be controlled. The motor 10 is provided at the rear with a bracket 18 which may be attached to any suitable supporting structure. To the front of the motor there is secured a rectangular box or casing 19 having a removable front plate 20.

The movements of the motor piston 12 are controlled by a pilot device 22 located within the casing 19. For this purpose I preferably utilize a four-way valve mechanism of the type shown in my prior Patent No. 1,992,048 granted February 19, 1935. This valve mechanism comprises walls forming an inlet chamber 23, an exhaust chamber 24, and two intermediate chambers 25. Communication between the intermediate chambers and the inlet and exhaust chambers is controlled by a pair of ball valves 27 which are actuated by a vertically reciprocable valve stem 28. The intermediate chambers are connected to the opposite ends of the cylinder 11 by means of tubes 29. A suitable fluid, such as oil, is delivered under pressure to the inlet chamber 23 through an inlet opening 31, and oil is free to escape from the exhaust chamber 24 through an exhaust opening 32. The valve stem 28 is actuated by means of a horizontal lever 34 fulcrumed on a thin flexible metal plate 35 which forms one wall of the exhaust chamber 24. The inner end of the lever engages the valve stem 28, and the outer end is connected to an actuating mechanism subject to a controlling impulse. This lever may be provided with a yieldable joint 36 of the type disclosed in my prior Patent No. 2,099,244, granted Nov. 16, 1937.

The actuating mechanism or control device for the pilot valve lever 34 comprises a flexible diaphragm in the form of a corrugated metal bellows 38 of well-known construction mounted in the lower portion of the casing 19. An opening 39 is provided in the lower end of the bellows for the admission thereto of fluid subject to variable pressure, this fluid supplying a controlling impulse for the entire regulator. The upper end of the bellows is connected by a vertical stud 40 to the lower end of an O-shaped member or hollow link 42, this stud being guided laterally by an antifriction bearing 43 mounted in a horizontal web 44 integral with the casing. The upper end of the member 42 is connected by a vertical stud 46 to a disk 47, the stud 46 being guided laterally by an antifriction bearing 48 mounted in a horizontal web 49 integral with the casing. The disk 47 supports the lower end of a coiled compression spring 51, the upper end of this spring engaging a flanged cup-shaped member 52 carried by a screw-threaded vertical spindle 53 having a nut 54 secured to its upper end. This spindle is rotatably supported by an antifriction thrust bearing 56 and a guide boss 57 mounted in the upper portion of the casing. Rotation of the member 52 is prevented by lugs 58 which project inwardly therefrom to engage vertical grooves 59 on the sides of the boss 57. The force exerted by the spring 51 is transmitted through the member 42 to the bellows 38 to balance the pressure of the fluid therein and, as this pressure varies, the member 42 will move upwardly or downwardly. By turning the nut 54 and spindle 53, the force of the spring can be adjusted as desired. In order to actuate the pilot valve in accordance with the movements of the member 42, the latter is provided with a lug 61 near its lower end from which a tapered stud 62 projects laterally. A comparatively thin vertical metal strip 63 is secured at its upper end to the outer end of the pilot valve lever 34, the lower end of this strip having an opening to receive the stud 62. A small coil spring 64 holds the strip in place on the stud and takes up all lost motion while allowing sufficient flexibility to prevent binding. It will be understood that the strip 63 will serve to transmit the vertical movements of the member 42 to the valve lever to rock the same.

Compensating mechanism is preferably provided to restore the pilot valve to its neutral position when the motor piston has traveled a predetermined distance dependent upon the change in the fluid pressure in the bellows 38. For this purpose the member 42 is provided with a laterally projecting lug 66 which engages the lower end of a comparatively light vertical coiled tension spring 67. The upper end of this spring is connected to a flexible roller chain 68 which extends upwardly in alignment with the spring and passes over an idler sprocket wheel 70 rotatably supported in the casing 19. The chain continues upwardly at a lateral inclination, as best shown in Fig. 1, and connects with a short arm 71 which is secured to the front end of a horizontal shaft 72 rotatably supported in the casing 19 and extending through the rear wall thereof. A long arm 74 is secured to the rear portion of the shaft 72, and the outer end of this long arm is connected to the piston rod 14 by means of a link 75. These parts are so arranged that inward movement of the piston rod (to the right) will cause the arm 74 to swing in a clockwise direction, and the tension of the spring 67 will be increased. It will be apparent that the arms 71 and 74, and the shaft 72, form a pivotally supported lever.

It is desirable to provide means for adjusting the operating range of the regulator, which may be defined as the amount of change in the loading afforded by the control device required to move the regulator piston 12 from one end of its stroke to the other. In the embodiment illustrated, this change in the loading is effected by variations in the fluid pressure applied within the bellows 38. In order to make this adjustment possible, I provide means for varying the effective length of the lever arm 71. For this purpose the chain 68 is connected to a nut 76 mounted on a screw 77, the screw being rotatably supported on the arm 71. By turning this screw, it is possible to move the nut 76 therealong, and vary the radial distance between the center of the shaft 72 and the end of the chain. If the end of the chain is brought into alignment with the shaft center, the operating range will be zero, and under these conditions if the fluid pressure within the bellows 38 departs from normal even in a very slight degree, the regulator piston will travel to one end of its stroke. On the other hand, the regulator can be given a substantial operating range when required.

With the construction as so far described, and under adverse conditions of operation, it may be found difficult to prevent a hunting action of the regulator unless it is adjusted for a rather large operating range. Yet under these same conditions it may be important to operate within a narrow range and hold the controlling pressure within very close limits. In order to make this possible, I provide means for yieldably restraining movements of the pilot valve, the amount of such restraint being dependent upon the rate of travel of the regulator piston and also preferably dependent upon the position of the said piston in relation to its cylinder.

Figure 2:
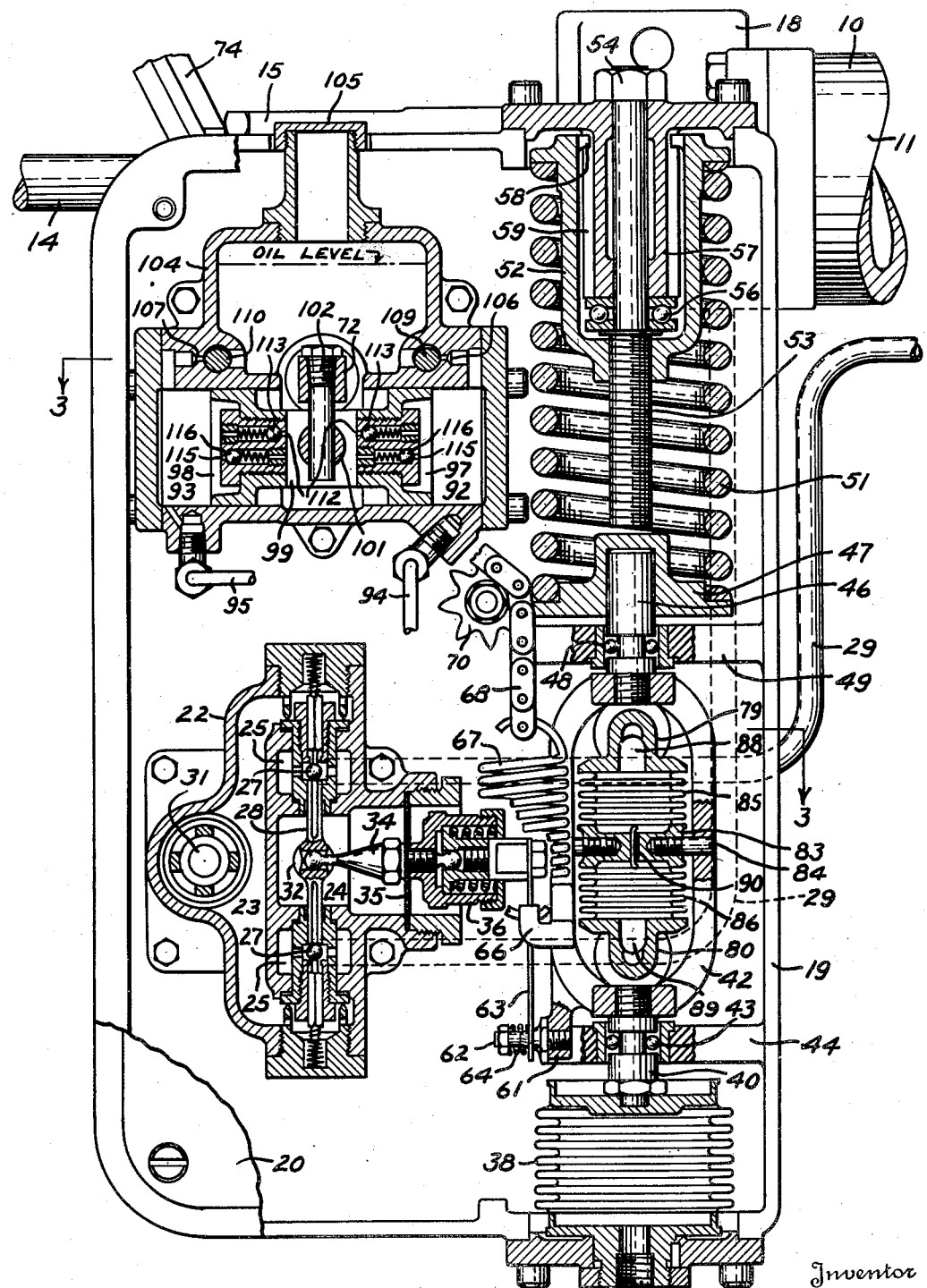
Fig. 2 is an enlarged fragmentary front view of the regulator, with certain parts shown in vertical section taken approximately on the line 2—2 of Fig. 3.
Figures 4, 5:
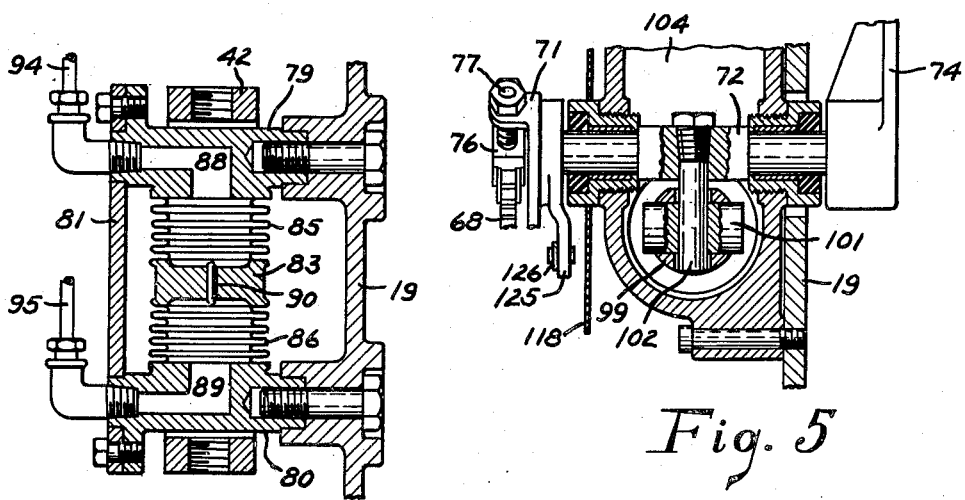
Fig. 4 is a fragmentary view in section on the line 4—4 of Fig. 3.
Fig. 5 is a fragmentary view in section on the line 5—5 of Fig. 3.

In order to restrain the pilot valve movements in this manner, two blocks 79 and 80 are bolted to the rear wall of the casing 19, as shown in Fig. 4, and extend forwardly through the interior of the member 42, their front ends being connected by a rigid bar 81. These blocks are vertically spaced, the block 79 being positioned above the block 80. Intermediate these blocks there is located a plate 83 which is attached to the member 42 by means of two oppositely extending horizontal pins 84 (Fig. 2). This plate is connected to the upper block 79 by a flexible diaphragm in the form of a corrugated metal bellows 85 and to the lower block 80 by a similar bellows 86. A passage 88 leads through the upper block 79 to the interior of the bellows 85, and a passage 89 leads through the lower block 80 to the interior of the bellows 86. A small hole is drilled vertically through the plate 83, and a pin 90 is mounted in this hole to nearly but not quite fill the same, whereby a tiny orifice is provided. This orifice will permit the upward escape of any air which may be trapped beneath the plate 83 when the system is filled with liquid, such as oil, this oil serving for the transmission of pressure impulses which will restrain the movements of the pilot valve in a desired manner.

Figure 3:
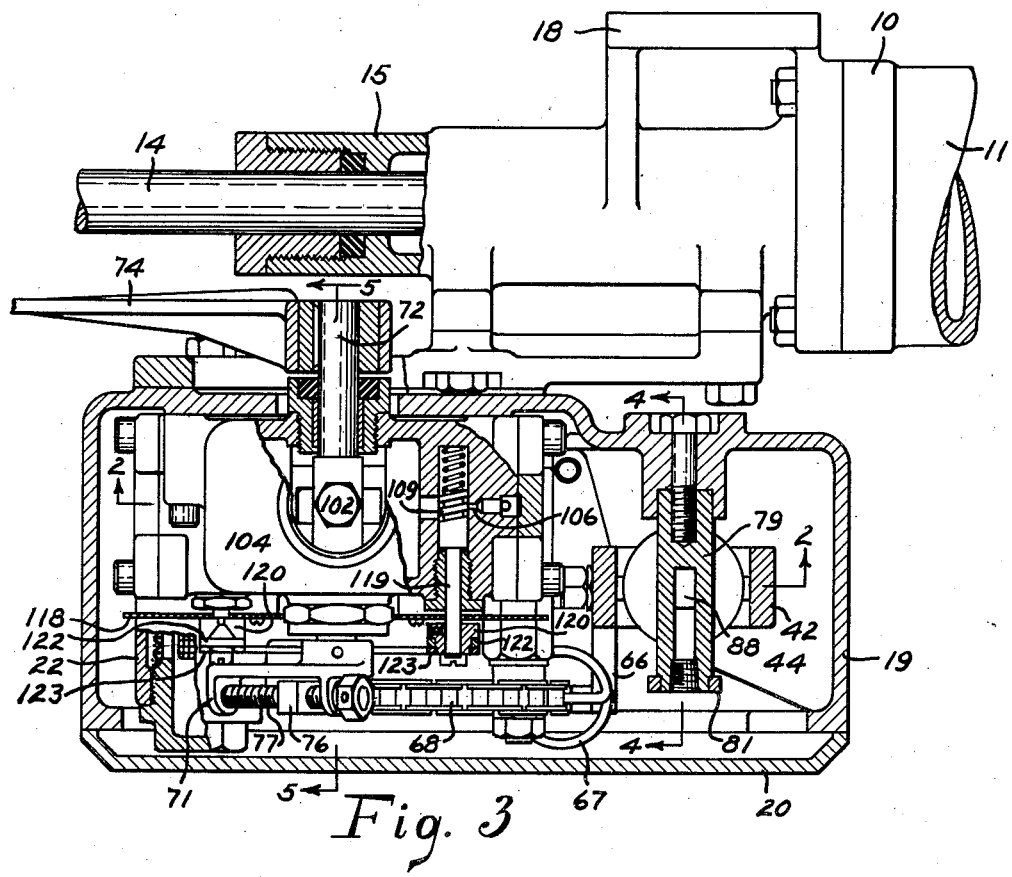
Fig. 3 is a fragmentary view with certain parts shown in horizontal section taken approximately on the line 3—3 of Fig. 2.

The pressure impulses are applied to the oil by a mechanism actuated by the movements of the regulator piston 12. In the preferred construction illustrated, two horizontally aligned cylinders 92 and 93 (Fig. 2) are mounted in the casing 19 somewhat below the shaft 72 and at opposite sides thereof. The cylinder 92 is connected by a tube 94 to the passage 88, and the cylinder 93 is connected by a tube 95 to the passage 89. Within the cylinders 92 and 93 there are mounted slidably pistons 97 and 98 respectively, these pistons being joined together by a central neck portion 99 in which a wrist pin 101 is mounted. This wrist pin is formed with a transverse bore for the reception of a driving pin 102 which projects downwardly from the shaft 72 thereabove. As this shaft is rocked by the arm 74, the pin 102 will oscillate, imparting a reciprocating motion to the pistons 97 and 98. Above the cylinders there is provided an oil reservoir 104 having a filler cap 105, this reservoir communicating with the cylinder 92 through a port 106 and with the cylinder 93 through a port 107. Rotary valves 109 and 110 control the ports 106 and 107 respectively, these valves being formed with screw threads of square section, as best shown in Fig. 3. The ports have restricted portions of substantially the same width as the threads, in a direction parallel with the valve axis, to that approximately one-half turn of a valve will suffice to move the same from fully open position to fully closed position. The reservoir communicates freely with the space between the pistons. Each of the pistons has a port 112 therethrough which is controlled by a spring-actuated ball check valve 113 arranged to open in the direction of flow toward the corresponding cylinder. Each of the pistons is also provided with a port 115 therethrough which is controlled by a spring-actuated ball relief valve 116 arranged to open in the direction of flow away from the corresponding cylinder. It will be understood that the check valve springs exert only sufficient force to ensure seating of each check valve as the corresponding piston starts to move into its cylinder. The relief valve springs, on the other hand, are arranged to hold the valves closed so long as the pressure in the cylinders is below a safe maximum value of say fifty pounds per square inch. The two pistons 97 and 98 may be considered as forming a single piston of the double-acting type.

With the construction as so far described, a pronounced stabilizing effect will be obtained, tending to prevent a hunting action of the regulator. Whenever the regulator piston rod 14 moves, the stabilizer pistons 92 and 93 will move simultaneously, and the oil pressure will be temporarily increased in the bellows 85 or the bellows 86 (as the case may be) tending to restore the member 42 and the pilot valve lever 34 to its neutral position. The amount of increase in oil pressure will depend not only upon the speed of piston travel but also upon the adjustment of the leak-off valves 109 and 110. Regulators of this type are often used to control dampers and similar devices which are particularly difficult to control when they are only slightly open. It is therefore desirable to provide an increased stabilizing effect when the damper is near its closed position. This result is obtained in accordance with the present invention by automatically adjusting the valves 109 and 110.

The means for obtaining this automatic adjustment is best shown in Figs. 1 and 3. A thin upright plate or dial 118 is mounted directly in front of the oil reservoir 104, and the leak-off valves 109 and 110 are provided with stems 119 which extend forwardly through this plate. Each stem 119 carries a pointer 120 which serves in conjunction with suitable indicia on the plate to show the position of the valve. These indicia are in the form of two semi-circular groups of numerals running from 0 to 10, the "0" corresponding to the closed position of the valve and the "10" corresponding to the open position of the valve. Each stem 119 also carries a depending arm 122 which is adjustably secured in place thereon by a nut 123. The shaft 72 carries a depending arm 125 which is connected by a pair of links 126 to the arms 122. Each arm 122 is formed with a slot 127 (Figs. 1 and 6) in which a screw 129 is mounted to provide a pivotal connection between the arm and the corresponding link 126. By adjusting these screws 129 along the slots 127, the effective lengths of the arms 122 can be varied as desired, thus adjusting the total angular movement of each leak-off valve for a complete stroke of the regulator. In addition, by adjusting the arms 122 with relation to the valve stems 119, it is possible to change the amount of opening of each leak-off valve for any given position of the main regulator piston 12. This is of great assistance in adapting the regulator to meet the particular operating conditions encountered at various installations.

The operation of the invention will now be apparent from the above disclosure. The downward force provided by the compression spring 51 is normally balanced by the upward force provided by the tension spring 67 and by the fluid pressure effective within the bellows 38. Under these conditions the pilot valve lever 34 will be in neutral position and the main piston 12 will remain stationary. A very slight increase in the fluid pressure will expand the bellows 38 and raise the link 42, which will raise the strip 63 and tip the lever 34. This will lower the valve stem 28 and admit oil to the right-hand end of the main cylinder 11, at the same time exhausting oil from the left-hand end of the cylinder. The main piston 12 will move toward the left, swinging the arm 74, shaft 72 and arm 71 in a counter-clockwise direction, and causing the chain 68 to lower the upper end of the tension spring 67. This will decrease the force which is applied by the spring 67 to the link 42, and as a result the compression spring 51 will force the link 42 downwardly. The pilot valve lever 34 will thus be returned to neutral position and the main piston 12 will come to rest. During this movement of the main piston and the counter-clockwise turning of the shaft 72, the pin 102 will move the stabilizer pistons 97 and 98 to the right. This will increase the oil pressure in the cylinder 92, tube 94 and bellows 85, creating a downward force on the plate 83 and link 42 which will aid in returning the pilot valve lever to its neutral position. This downward force is only a temporary stabilizing force, since oil can escape from the cylinder 92 through the port 106 under the control of the leak-off valve 109, so that it will not affect the final position of the main piston, but it will have a decided effect in preventing over-travel of the main piston. The more rapid the piston travel, the greater the stabilizing force will be, and the increased tendency for over-travel at high speed will be counteracted. Furthermore, during the movement of the main piston to the left, and the resultant counter-clockwise turning of the shaft 72, the links 126 will turn the leak-off valves 109 and 110 in a counter-clockwise direction toward their closed positions. This will increase the stabilizing effect as the piston rod 14 approaches its fully extended position, which would correspond in the usual installation to the closed position of the valve or damper being regulated. Since devices of this type are much more sensitive when nearly closed, this increased stabilizing effect is highly desirable in order to avoid hunting under these conditions.

If the fluid pressure in the bellows 38 decreases even slightly, the bellows will yield and permit the compression spring 51 to move the link 42 downwardly, which will lower the strip 63 and tip the lever 34 in such a direction as to raise the pilot valve stem 28 and admit oil to the left-hand end of the main cylinder 11, at the same time exhausting oil from the right-hand end of the cylinder. The main piston 12 will move toward the right, turning the shaft 72 in a clockwise direction, and raising the chain 68 until the tension in the spring 67 has increased sufficiently to overcome the effect of the decreased fluid pressure, thus restoring the pilot valve to neutral position and stopping the piston movement. As this movement takes place, the stabilizer pistons 97 and 98 will be moved to the left, increasing the oil pressure in the cylinder 93, tube 95 and bellows 86. This will create an upward force on the plate 83 and link 42 which will aid in returning the pilot valve lever to neutral position. In addition, the leak-off valves 109 and 110 will be turned toward their open positions to reduce the stabilizing effect.

It will be apparent that during the movements of the stabilizer pistons, the check valves 113 will open whenever necessary to prevent the production of a vacuum in one of the stabilizer cylinders 92 or 93. This might occur if the regulator should make a very sudden stroke and the leak-off valves were nearly closed. Furthermore, under these same conditions, the relief valves 116 will open whenever necessary to prevent an excessive pressure in either of the cylinders. Obviously, by turning the leak-off valves 109 and 110 through 180 degrees relative to the pointers 120 and arms 122, these valves can be made to close with a clockwise movement rather than a counter-clockwise movement. This would produce an increasing stabilizing effect as the piston rod 14 moves to the right, which might be desirable in certain installations, particularly if such movement should correspond to a closing movement of the valve or damper being controlled.

The flexible strip 63 provides a very advantageous connection between the link 42 and the pilot valve lever 34. This connection is free from friction, and the spring 64 prevents any lost motion by holding the strip in place on the tapered stud 62.

Having thus described my invention, what I claim as new and desire to secure by Letters Patent is:

1. A regulator comprising a motor having a movable element, a pilot mechanism to control the motor, the pilot mechanism having a neutral position such that the said motor element will remain stationary, a control device for the pilot mechanism, a stabilizer actuated by the motor when the pilot mechanism is displaced from its neutral position and effective to produce a temporary increase in the pressure of a fluid which will tend to return the pilot mechanism to its neutral position, the stabilizer having an adjustable device for varying the amount of such increase in pressure, and connections from the motor to the said adjustable device arranged to adjust the same in accordance with the position of the movable element of the motor.

2. A regulator comprising a motor having a movable element, a pilot mechanism to control the motor, the pilot mechanism having a neutral position such that the said motor element will remain stationary, a control device for the pilot mechanism, a stabilizer actuated by the motor when the pilot mechanism is displaced from its neutral position and effective to produce a temporary increase in the pressure of a fluid which will tend to return the pilot mechanism to its neutral position, the stabilizer having an adjustable leak-off valve through which the fluid may escape to reduce the said pressure, and connections from the motor to the said leak-off valve arranged to adjust the same in accordance with the position of the movable element of the motor.

3. A regulator comprising a motor having a movable element, a pilot mechanism to control the motor, the pilot mechanism having a neutral position such that the said motor element will remain stationary, a control device for the pilot mechanism, a stabilizer actuated by the motor when the pilot mechanism is displaced from its neutral position and effective to produce a temporary increase in the pressure of a fluid which will tend to return the pilot mechanism to its neutral position, the stabilizer having an adjustable leak-off valve through which the fluid may escape to reduce the said pressure, and connections from the motor to the said leak-off valve to adjust the same in accordance with the position of the movable element of the motor, the said connections being adjustable to vary the amount of leak-off valve adjustment for a given movement of the motor element.

4. A regulator comprising a motor having a movable element, a pilot mechanism to control the motor, the pilot mechanism having a neutral position such that the said motor element will remain stationary, a control device for the pilot mechanism, a stabilizer actuated by the motor when the pilot mechanism is displaced from its neutral position and effective to produce a temporary increase in the pressure of a fluid which will tend to return the pilot mechanism to its neutral position, the stabilizer having a leak-off port through which the fluid may escape to reduce the said pressure, a rotary leak-off valve having an external screw thread thereon located adjacent the said port to control the effective area thereof, and connections from the motor to the said leak-off valve to turn the same in accordance with the position of the movable element of the motor.

5. A regulator comprising a motor having an element movable in opposite directions, a pilot mechanism to control the motor, the pilot mechanism having a neutral position such that the said movable element will remain stationary, a control device for the pilot mechanism, a pair of stationary blocks spaced apart, a movable plate located between the blocks, means connecting the plate to the control device, a flexible bellows connecting the plate with one of the blocks, a second flexible bellows connecting the plate with the other of the blocks, a stabilizer actuated by the motor when the pilot mechanism is displaced from its neutral position and effective to deliver pressure fluid into one or the other of the said bellows as required to create a force on the said plate tending to return the pilot mechanism to its neutral position, the stabilizer having two adjustable leak-off valves through which the fluid may escape and thereby reduce the pressure of the fluid supplied to the respective bellows, and connections from the motor element to the two leak-off valves to adjust the same in accordance with the position of the said motor element.

6. A regulator comprising a motor having an element movable in opposite directions, a pilot mechanism to control the motor, the pilot mechanism having a neutral position such that the said movable element will remain stationary, a pair of stationary blocks spaced apart, a reciprocable hollow link surrounding the blocks, means connecting the link to the pilot mechanism, a control device connected to the link to urge the same in one direction, adjustable means yieldably urging the link in the opposite direction, a plate mounted between the blocks and connected to the link, two flexible bellows connecting the plate with the respective blocks, and a stabilizer actuated by the motor when the pilot mechanism is displaced from its neutral position, the stabilizer being arranged to deliver pressure fluid into one or the other of the said bellows as required to create a force on the said plate tending to return the pilot mechanism to its neutral position.

7. A regulator comprising a motor having an element movable in opposite directions, a pilot mechanism to control the motor, the pilot mechanism having a neutral position such that the said movable element will remain stationary, a pivotally mounted lever to actuate the pilot mechanism, a reciprocable link, a comparatively thin strip connecting the link to the lever, a control device connected to the link to urge the same in one direction, and adjustable means yieldably urging the link in the opposite direction.

8. A regulator comprising a motor having an element movable in opposite directions, a pilot mechanism to control the motor, the pilot mechanism having a neutral position such that the said movable element will remain stationary, a control device for the pilot mechanism, two expansible chambers connected to the pilot mechanism in opposing relationship and adapted when expanded to move the pilot mechanism in opposite directions, two axially aligned cylinders, conduits connecting the cylinders to the respective chambers, a slidable piston in each cylinder to force pressure fluid therefrom into the chambers, an adjustable leak-off valve associated with each cylinder through which a portion of the fluid may escape, a rock shaft, means connecting the motor element to the shaft to rock the same, means connecting the shaft to the pistons to slide the same, and means connecting the shaft to the leak-off valves to open the valves when the shaft is turned in one direction and to close the valves when the shaft is turned in the other direction.

PAUL C. TEMPLE.